(12) United States Patent
Christensen et al.

(10) Patent No.: US 9,162,752 B2
(45) Date of Patent: Oct. 20, 2015

(54) FLIGHT CONTROL LAWS FOR AUTOMATIC HOVER HOLD

(75) Inventors: Kevin Thomas Christensen, Plano, TX (US); Shyhpyng Jack Shue, Grapevine, TX (US); Troy Sheldon Caudill, Burleson, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 323 days.

(21) Appl. No.: 13/703,640

(22) PCT Filed: Jul. 15, 2011

(86) PCT No.: PCT/US2011/044160
§ 371 (c)(1),
(2), (4) Date: Dec. 12, 2012

(87) PCT Pub. No.: WO2013/012408
PCT Pub. Date: Jan. 24, 2013

(65) Prior Publication Data
US 2013/0138270 A1    May 30, 2013

(51) Int. Cl.
| | |
|---|---|
| *G01C 23/00* | (2006.01) |
| *B64C 11/00* | (2006.01) |
| *B64C 19/00* | (2006.01) |
| *G05D 1/10* | (2006.01) |

(52) U.S. Cl.
CPC ............... *B64C 19/00* (2013.01); *G05D 1/102* (2013.01)

(58) Field of Classification Search
USPC .......................................... 701/3; 244/17.13
See application file for complete search history.

(56) References Cited

U.S. PATENT DOCUMENTS

| | | | |
|---|---|---|---|
| 3,265,332 A | 8/1966 | Rasmussen | |
| 4,029,271 A | 6/1977 | Murphy et al. | |
| 4,382,283 A | 5/1983 | Clelford | |
| 4,645,141 A | 2/1987 | McElreath | |
| 5,001,646 A | 3/1991 | Caldwell | |
| 8,332,082 B2 * | 12/2012 | Christensen et al. | 701/3 |
| 8,386,093 B2 * | 2/2013 | Lin et al. | 701/3 |
| 8,496,199 B2 * | 7/2013 | Fortenbaugh et al. | 244/17.13 |
| 8,662,439 B2 * | 3/2014 | Fortenbaugh et al. | 244/17.13 |
| 8,688,295 B2 * | 4/2014 | Ellis et al. | 701/3 |
| 2008/0097658 A1 * | 4/2008 | Shue et al. | 701/8 |
| 2008/0234881 A1 | 9/2008 | Cherepinsky | |
| 2008/0237392 A1 | 10/2008 | Piasecki | |
| 2009/0004004 A1 * | 1/2009 | Vincenzi | 416/1 |

(Continued)

OTHER PUBLICATIONS

Written Opinion of the International Searching Authority dated Dec. 19, 2011 from counterpart international App. No. PCT/US2011/044160.

(Continued)

*Primary Examiner* — Thomas G Black
*Assistant Examiner* — Tyler Paige
(74) *Attorney, Agent, or Firm* — James E. Walton (57) ABSTRACT

A system and method to control hovering flight of a rotary aircraft. The system including a lateral speed hold loop, a longitudinal loop, a vertical control loop, and a directional loop. The method includes defining a first flight envelope having a first groundspeed threshold; defining a second flight envelope having a second groundspeed threshold, the second flight envelope being defined within the first envelope; engaging a hover hold with a control law hover hold architecture as the aircraft enters the first flight envelope; and engaging a position hold with a control law position hold architecture as the aircraft enters the second flight envelope.

20 Claims, 10 Drawing Sheets

(56) References Cited

U.S. PATENT DOCUMENTS

| | | | |
|---|---|---|---|
| 2009/0266940 A1 | 10/2009 | Miller et al. | |
| 2010/0076625 A1 | 3/2010 | Yoeli | |
| 2011/0137492 A1* | 6/2011 | Sahasrabudhe et al. | 701/3 |
| 2013/0138270 A1* | 5/2013 | Christensen et al. | 701/3 |
| 2013/0261853 A1* | 10/2013 | Shue et al. | 701/3 |
| 2014/0027564 A1* | 1/2014 | Mercer et al. | 244/17.13 |

OTHER PUBLICATIONS

Office Action dated Dec. 4, 2014 from Counterpart EP App. No. 11869682.2.

Office Action dated Mar. 4, 2015 from Counterpart CA App. No. 2,841,758.

Extended European Search Report dated Mar. 15, 2015 from Counterpart EP App. No. 11869682.2.

* cited by examiner

FLIGHT CONTROL LAWS FOR AUTOMATIC HOVER HOLD

TECHNICAL FIELD

The present application relates generally to flight control systems, and more particularly, to flight control laws for automatic hover hold.

DESCRIPTION OF THE PRIOR ART

Brownout or whiteout is a phenomenon where flight visibility is reduced due to airborne particles from rotor downwash. During brownout, the pilot is unable to see nearby objects which are necessary to provide outside visual references in order to control the aircraft while hovering near the ground. Because of brownout, the degraded visual environment can cause the pilot to lose awareness, which can lead to an accident.

Brownout during helicopter landing and take-off operations in arid desert terrain has been responsible for more than 30 accidents in recent years. Intense, blinding dust clouds stirred up by the helicopter rotor downwash can cause significant flight safety risks from ground obstacle collisions and dynamic rollover due to uneven terrain.

In 2004, an emergency medical services (EMS) helicopter crashed into terrain while maneuvering in reduced visibility at night. The pilot, flight paramedic, patient, and patient's mother were killed, and the flight nurse was seriously injured. Witnesses reported brownout conditions at the time of the accident.

Brownout crashes have claimed more helicopters in recent military operations than all other threats combined. More than 20 cases due to brownout were reported during military activities in Iraq and Afghanistan. These mishaps resulted in aircraft damage and, in many cases, involved aircrew injury and death.

In 2001, a U.S. Marine Corps UH-1N inadvertently touched down during takeoff while drifting to the right and rolled over. One member of the crew was ejected and the other three crewmen were able to exit prior to the aircraft being destroyed by fire.

Also in 2001, a MH-60K Blackhawk search and rescue helicopter caused a brownout during a night approach, obscuring the landing area. The aircraft crashed in a sand dune, resulting in two deaths and injuries to three others.

Brownout and whiteout conditions can be caused by sand storms, low wind-shear interaction, and helicopter downwash with ground effect. In most cases, the brownout scenario is unavoidable. Flying into this kind of environment can be very challenging when encountering an unprepared landing site, obstacles in the landing zone or flight path, loss of the horizontal reference, instrument malfunctions, windy conditions, sensor errors, jammed actuators, or ground effect interactions.

Several new methods and devices to aid the pilot in brownout situations have been introduced in recent years. These include site preparation such as a suitable landing mat, pilot training, synthetic vision systems also known as "see and remember", upgraded horizontal situation indicator with accelerations cueing, and aerodynamics such as the "winged rotor".

Although the foregoing devices and methods represent great strides in aircraft control, many shortcomings remain.

BRIEF DESCRIPTION OF THE DRAWINGS

The novel features believed characteristic of the application are set forth in the appended claims. However, the application itself, as well as a preferred mode of use, and further objectives and advantages thereof, will best be understood with reference to the following detailed description when read in conjunction with the accompanying drawings, wherein:

While the control system of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DESCRIPTION OF THE PREFERRED EMBODIMENT

The present application is directed to existing aircraft sensors, actuators, and control laws to help the pilot overcome brownout or degraded visual environment (DVE) flight. The innovative control law architecture, with advanced concepts to stabilize the aircraft, allows the pilot to maneuver at low speed with minimal compensation and workload. It has been demonstrated in previous flight testing that even with wind conditions as high as 30-35 knots, aircraft performance will not degrade with the advanced control laws (CLAWS) of the present application. More than 80 hours of flight testing have been conducted to prove the robustness of these CLAWS. Furthermore, it has been shown that even non-pilots can handle the aircraft utilizing the CLAWS of the present application.

Figure 1:
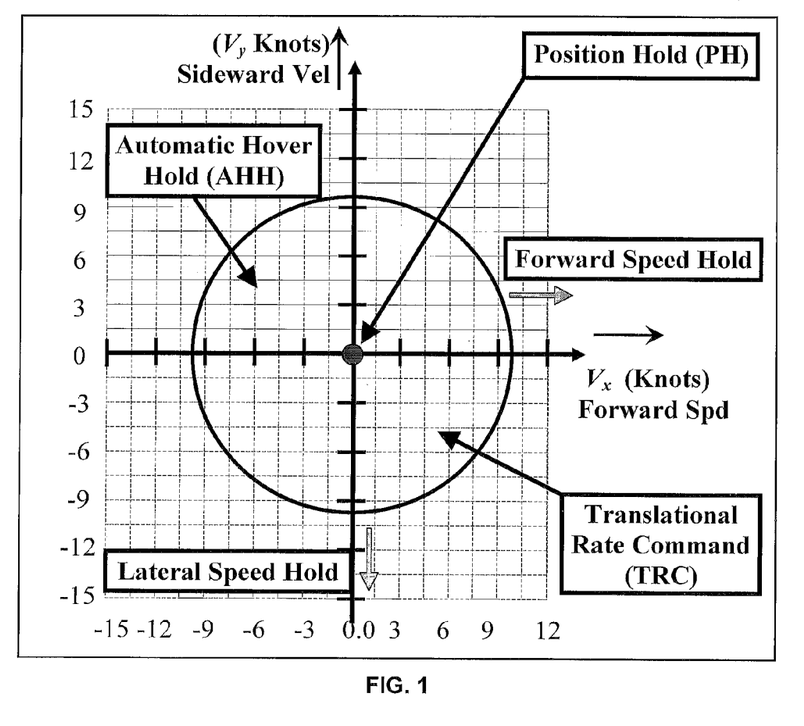
FIG. 1 shows the automatic hover hold (AHH), translational rate command (TRC) and position hold (PH) regions.

Referring now to FIG. 1 in the drawings, various flight envelopes are depicted in chart 101. Automatic hover hold (AHH) 102 will engage if the pilot releases both the longitudinal and lateral controls when groundspeed is less than 10 knots in the preferred embodiment. This AHH threshold can be adjusted based on mission requirements. Position hold (PH) 103 will engage below 1 knot groundspeed if both the longitudinal and lateral controls are released. Once AHH has been engaged, if the pilot moves the longitudinal or lateral control out of the zero force detent position, then the CLAWS will enter the translational rate command (TRC) mode 104. In this region, the aircraft will fly at a groundspeed proportional to the amount of control displacement. The TRC mode will disengage if the TRC or actual groundspeed exceeds the AHH threshold. At that time, the CLAWS can enter either an attitude command or rate command mode, depending on mission requirements.

This invention is comprised of four functions. The first function is AHH as shown in the AHH and TRC mode regions of FIG. 1. The second function is PH as shown in the PH region of FIG. 1. The third function is called high speed transition to hover (HSTH). The fourth function is called emergency hover hold (EHH). These four functions are applicable to both fly-by-wire, as well as traditional mechanical flight control systems with partial authority flight control actuators.

The AHH mode will smoothly and automatically engage as the rotorcraft decelerates from a higher ground speed to within the default AHH speed range. The PH mode will automatically engage when the ground speed is lower than 1 knot. PH will disengage whenever the pilot displaces the longitudinal or lateral controller. If longitudinal or lateral control displacement is less than or equal to 1.0 inch, the TRC mode will be active. If controller displacement is more than 1.0 inch, then the attitude or rate command mode will engage. Additionally, if the stick is released to the detent position with groundspeed below 10 knots, the aircraft will automatically enter a hover. Once groundspeed is below 1 knot, the PH mode will be engaged to hold the new hover position.

For the HSTH function, the pilot can slow down by moving the stick aft and then using aft beep to trim the aircraft at a higher pitch angle, for example 15 degrees. The aircraft will decelerate at a constant rate and then automatically hover when groundspeed is lower than 10 knots. The initial pitch angle setting will determine the deceleration rate of the aircraft. A higher initial pitch angle will result in a quicker deceleration.

The EHH function can be engaged when the aircraft meets one or more of the following emergency conditions: if the pilot loses consciousness (i.e. a heart attack or battle injuries as detected by a pilot pulse detector or eye contact device installed in the cockpit); if the pilot feels the need to release the control of the aircraft to the flight control computer in scenarios such as brownout or DVE; if the EHH switch installed in the cockpit is activated; or if an out of control condition is caused by certain equipment, device, or sensor failures.

Auto-land of the aircraft can be implemented by merging the EHH mode with an automatic descent to touchdown. However, if the auto-land is flown to an uncharted landing zone, it may require assistance from a synthetic visual system or field operator to avoid any ground objects during the final landing approach.

The flight control laws described above require several control loops, which are based on their corresponding axes:
1) In the longitudinal axis:
   Longitudinal rate command attitude hold (RCAH)—Long2q,
   Longitudinal attitude command attitude hold (ACAH)—Long2Theta, and
   Forward speed hold (FSH) and TRC—Long2Vx.
2) In the lateral axis:
   Lateral rate command attitude hold (RCAH)—Lat2p,
   Lateral attitude command attitude hold (ACAH)—Lat2Phi, and
   Lateral speed hold (LSH) and TRC—lat2Vy.
3) In the directional axis:
   Yaw rate command (YRC)—Ped2r, and
   Heading hold (HH)—Ped2Psi.
4) In the vertical axis:
   Radar Altitude Hold (RAH)—Coll2Alt, and
   Vertical Speed Hold (VSH)—Coll2VS.

Note that RCAH is the first loop in each of the longitudinal, lateral, and directional axes. To stabilize these loops, the six degrees of freedom flight dynamics are decoupled based on the aircraft flight characteristics. Individual decoupling of each axis improves aircraft stability.

In AHH/TRC region, the aircraft will use the following controls in each loop:
1) Longitudinal: Long2Vx,
2) Lateral: Lat2Vy,
3) Directional: Ped2Psi, and
4) Vertical: Coll2Alt.

With the correct guidance arrangement and control input architecture, the CLAWS presented in this application have made switchless automatic hover hold effective and smooth.

Detailed Loop Design

The functions of the automatic hover hold invention described in this patent application reside in the advanced CLAWS. The architecture of each individual loop design is not the same as conventional CLAWS. Individual guidance loops have been designed to provide carefree, single axis maneuverability in the various flight regimes. In this present application, the emphasis is on:
How to bring the aircraft back to hover mode,
How to maneuver around the hover regime,
How to transition from the AHH region to attitude or rate command mode, and then to speed hold mode, and
How to quickly transition the aircraft back to hover in an emergency.

To accomplish the functions presented in this application (AHH, TRC, PH, HSTH, and EHH), the individual axes of control loops are discussed below. It should be noted that both fly-by-wire and traditional mechanical flight control systems with partial authority control actuators can achieve or perform these functions.

Simplified Flight Control Laws Descriptions

Figure 2:
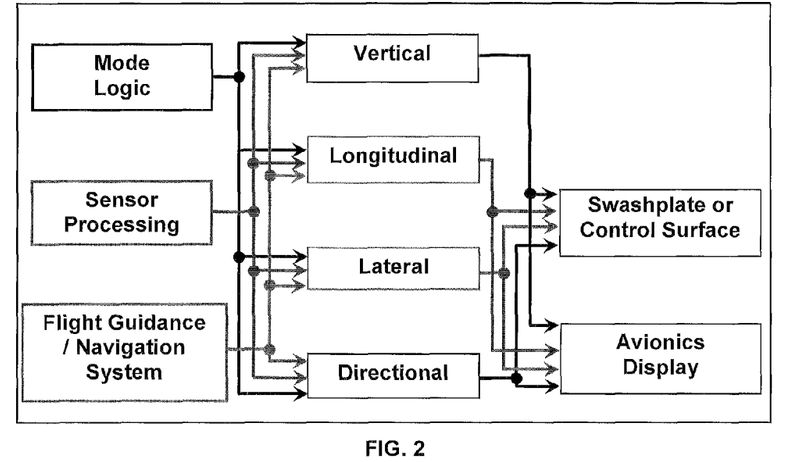
FIG. 2 shows the simplified flight control law design with logic.

General flight control law architecture 201 is illustrated in FIG. 2. For helicopters, the longitudinal controller is utilized to control the aircraft pitch attitude by actuating the swashplate to create a forward or aft tilting of the rotor tip path plane. With sensors and logic integrated into the flight control laws, the longitudinal axis can be used to control pitch rate, pitch angle, and forward/aft speed.

For helicopters, the lateral controller is utilized to control the aircraft roll attitude by actuating the swashplate to create a lateral tilting of the rotor tip path plane. The lateral axis can be employed to control roll rate, bank attitude, and lateral speed, with sensors and logic integrated into flight control laws.

For conventional helicopters, the directional controller is utilized to control the aircraft heading by commanding tail rotor blade pitch angle. With sensors and logic integrated into flight control laws, the directional axis can be used to control yaw rate and heading at low speed Finally, for a conventional helicopter, the vertical controller is utilized to control the aircraft altitude by commanding the main rotor collective blade pitch angle. With sensors and logic integrated into flight control laws, the vertical axis can be used to control vertical speed and altitude.

In order to optimize the performance of the automatic hover hold CLAWS, methodologies to decouple and stabilize each aircraft axis are combined with the logic integration shown in FIG. 2. Therefore, the longitudinal 203, lateral 205, directional 207, and vertical 209 axes can be designed separately with little inter axis coupling.

Simplified Longitudinal Control Law Loops

Figure 3:
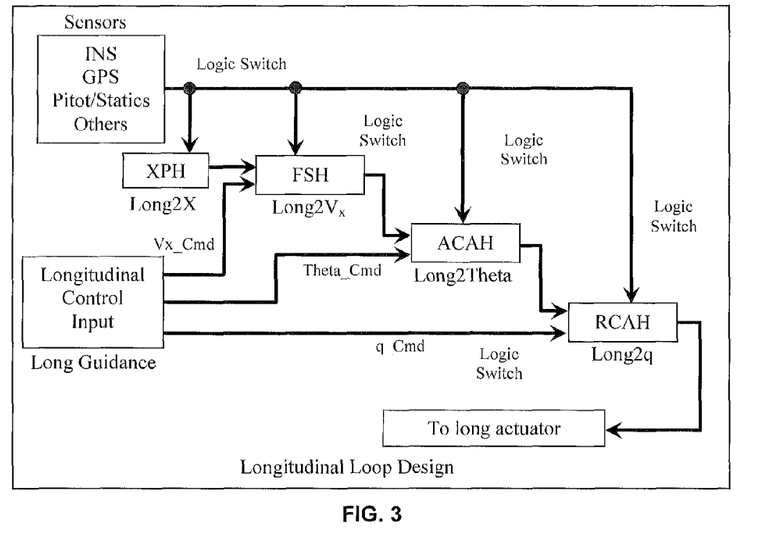
FIG. 3 shows longitudinal loop design.

The longitudinal loop design 301 is shown in FIG. 3. The mode switching logic for the longitudinal CLAW design 301 is defined as Mode Logic 211 shown in FIG. 2. Arrangement of these longitudinal control loops is based on the nature of flight dynamics. In the longitudinal axis, the pitch rate is part of the short period mode, which acts quickly in the flight dynamics. Pitch attitude and longitudinal speed variables form the Phugoid mode of the longitudinal motion, which is a slow motion of the longitudinal axis. The pitch rate is preferably the first loop in the control laws since it is the fastest longitudinal state. By controlling pitch rate, pitch attitude can be added as the second loop. With pitch attitude stabilized and controlled, FSH can be added as the third loop.

CLAW logic will automatically initialize and engage the FSH loop 303, also called Long2Vx, when the longitudinal controller is returned to the detent position and groundspeed is outside of the AHH region as shown in FIG. 1. When the longitudinal stick is out of detent, the longitudinal axis can be controlled by either the pitch attitude (Long2Theta) 305 or the pitch rate (Long2q) loop 307. These functions are called position command and or rate command, respectively. Similarly, the longitudinal beep commands can be integrated into all three loops.

The steady state attitude search method is employed during initialization of the FSH loop to make it more robust. The FSH function will be able to stabilize more quickly at any ground speed or airspeed by initializing to the approximate pitch attitude required to hold that speed.

The longitudinal control input loop 301 shown in FIG. 3 is employed to convert the pilot input from the longitudinal controller to the associated command format depending on which loop is in use. The associated command inputs from the pilot are converted in Tables 1 and 2.

Figure 4:
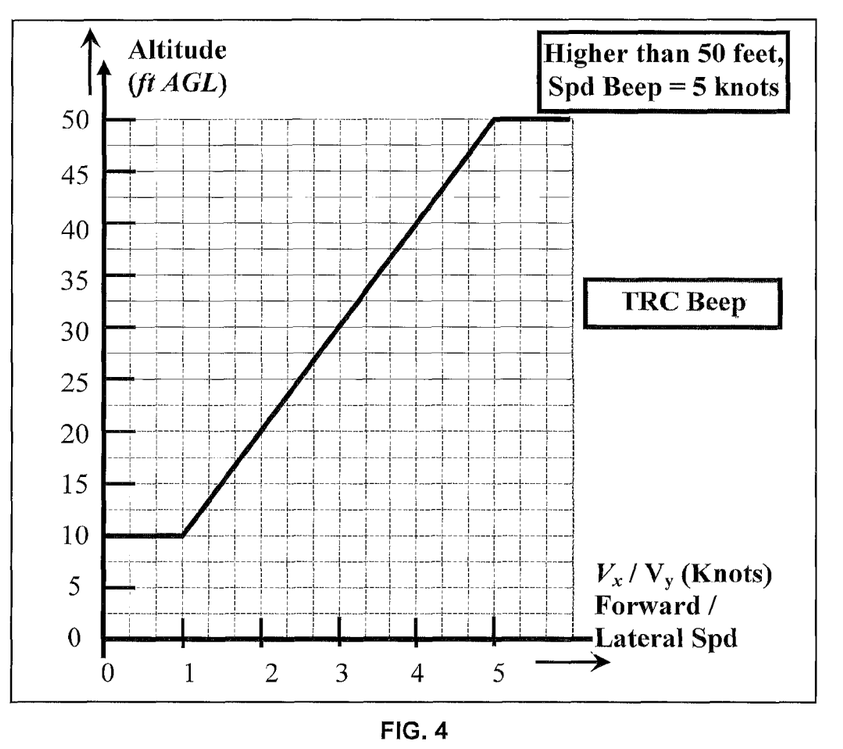
FIG. 4 shows the longitudinal and lateral TRC beep scheduling.

Longitudinal speed beep 401 during flight in the AHH/TRC region is shown in FIG. 4. The TRC mode longitudinal beep function is gain scheduled with respect to the altitude above ground level (AGL). When altitude is lower than 10 feet, the speed beep is 1 knot. The groundspeed for longitudinal beep increases proportionally from 1 to 5 knots as altitude AGL increases from 10 to 50 feet. The maximum longitudinal beep speed of 5 knots occurs when altitude AGL is at or above 50 feet.

The innovation of the control input design provides the following advanced benefits: the ability of the pilot to precisely control angle rate, attitude position, or translational rate; easy adjustment of control sensitivity to match design guidelines or make adjustments during flight test; the ability of the pilot to use the beep command switch to fine tune attitude, speed, or position; the ability of the pilot to seamlessly transition from one mode to another during each maneuver; and the ability of the pilot to fly the aircraft with increased agility.

Simplified Lateral Control Law Loops

Figure 5:
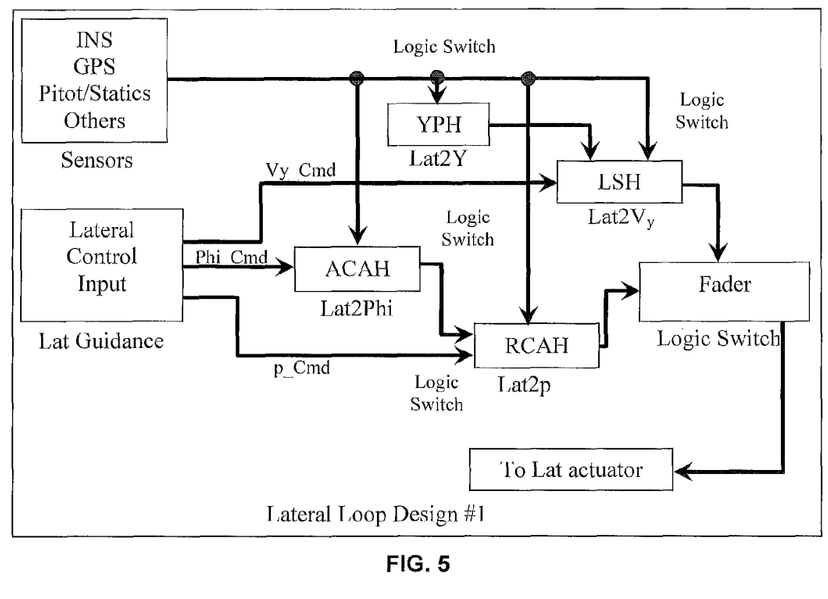
FIG. 5 shows lateral loop design with a separate lateral speed loop.
Figure 6:
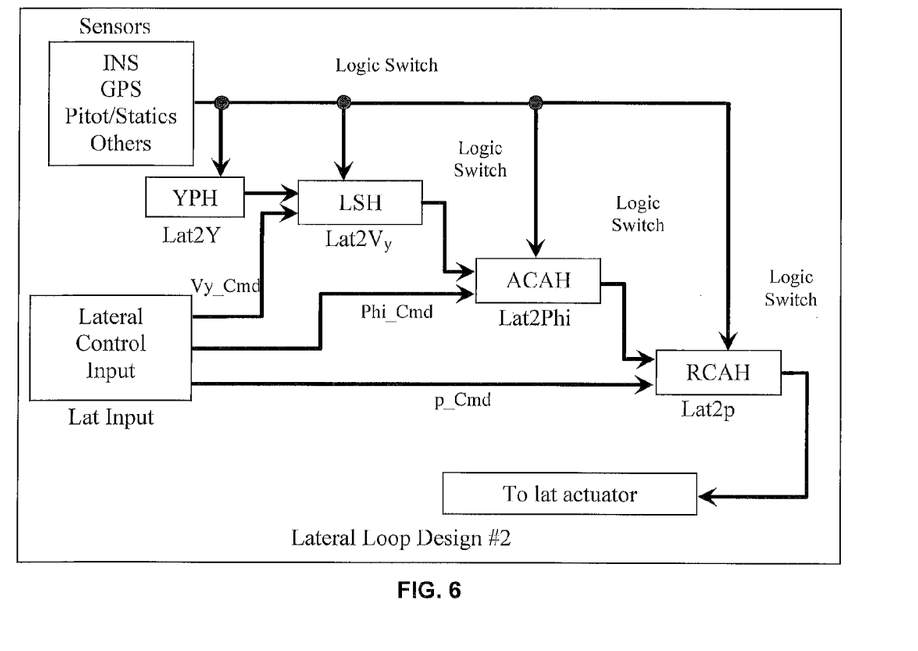
FIG. 6 shows lateral loop design with an integrated lateral speed loop.

The lateral loop design is shown in FIGS. 5 and 6. The mode switching logic of the lateral control law design is defined as Mode Logic 211 shown in FIG. 2. There are two lateral loop designs for TRC mode. Lateral loop 501 is defined in FIG. 5 and the other lateral loop design 601 is defined in FIG. 6. The difference between loop 501 and loop 601 is Lat2Vy loop 503. Since lateral speed in flight dynamics can be considered a fast mode for an aircraft during slow speed or hovering flight, Lat2Vy does not have to feed the Lat2Phi loop 505. The arrangement of the lateral control loop, as shown in FIG. 5, is based on the nature of the flight dynamics. In the lateral axis, the roll rate and lateral velocity variables are part of the rolling mode, which acts rapidly in flight dynamics. The roll attitude and yaw rate variables form the Dutch roll and spiral modes for lateral motion. The roll attitude and yaw rate variables are considered a slow motion of the lateral axis. Since the fastest lateral state can be either the roll rate or lateral velocity, the lateral loop design is different from the longitudinal axis. During low speed flight, the fastest lateral state of the aircraft developed from the rolling mode is either lateral velocity or roll rate. Therefore, in the present application, the lateral velocity loop can stand-alone for TRC maneuvering without going through the roll angle (Lat2phi) or roll rate (Lat2p) loops. LSH is improved and PH will precisely hold the aircraft's spot over the ground even under high wind conditions. For this reason, there are two first loops in the lateral control laws shown in FIG. 5. One is for the LSH loop 503, defined as Lat2Vy, and the other is the roll rate control loop 507, defined as Lat2p. With roll rate under control, bank attitude can be added as the second loop. The fader switch 509 between the Lat2Vy and Lat2p loops is added to smooth the transition between these two loops.

FIG. 6 shows a different arrangement for Lat2Vy loop. In this embodiment, the Lat2Vy loop feeds the Lat2Phi loop. This design is similar to that of the longitudinal axis by assuming that the LSH loop is slow and is controlled by the roll angle of the aircraft. The bandwidth of this mode is lower than the FIG. 5 design. However, both designs are reserved in the present application. Furthermore, both LSH designs have been successfully demonstrated in flight testing.

CLAW logic will automatically initialize and engage the LSH loop 503, also called Lat2Vy, when the lateral controller is returned to the detent position and groundspeed is outside of the AHH region as shown in FIG. 1. When the lateral controller is out of detent, the aircraft's lateral axis can be controlled by either the roll attitude (Lat2Phi) or the roll rate (Lat2p) loop. These functions are called position command or rate command, respectively. Similarly, lateral beep commands can be integrated into all three loops.

Like FSH, the steady state attitude search method is employed during initialization of the LSH loop to make it more robust. The LSH function will be able to stabilize more quickly at any ground speed by initializing to the approximate bank angle required to hold that speed.

The lateral control input loops shown in FIGS. 5 and 6 are employed to convert the pilot input from the lateral controller to associated command formats depending on which loop is in use. The associated command inputs from the pilot are converted in Tables 3 and 4.

The lateral speed beep in TRC mode is shown in FIG. 4. Like the longitudinal axis, the TRC mode lateral speed beep function is gain scheduled with respect to the altitude AGL. When altitude is lower than 10 feet, the speed beep is 1 knot. The groundspeed for lateral beep increases proportionally from 1 to 5 knots as altitude AGL increases from 10 to 50 feet. The maximum lateral speed beep of 5 knots per second in TRC mode occurs when altitude AGL is at or above 50 feet.

Simplified Directional Control Law Loops

Figure 7:
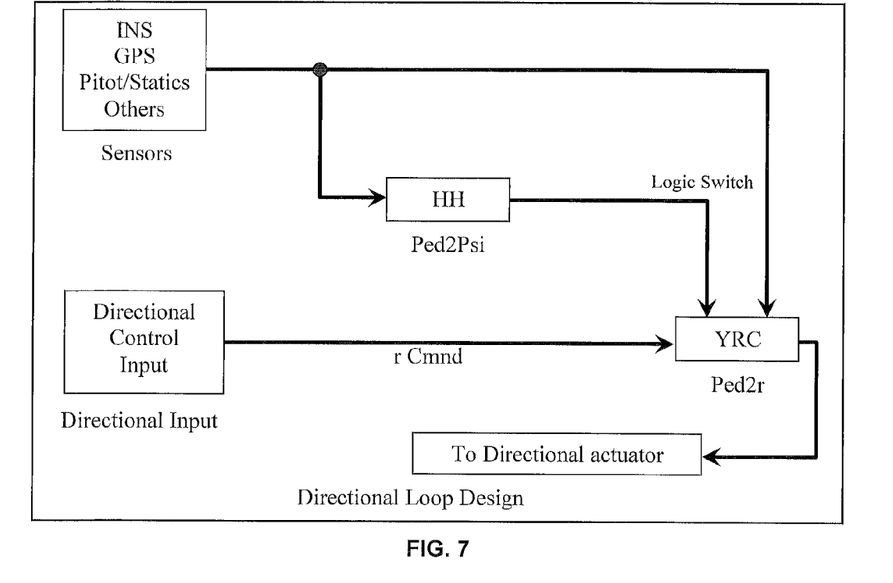
FIG. 7 shows directional loop design.

The directional loop design 701 is shown in FIG. 7. The mode switching logic of directional control law design is defined as Mode Logic 211 shown in FIG. 2.

The preferred embodiment assumes that the yaw rate is the fastest directional state. Design 701 further includes a HH loop 703 (Ped2Psi), outside of the YRC loop 705 (Ped2r). When in the AHH region, the directional axis is designed to control heading through the spiral mode.

In the preferred embodiment, YRC is the first loop for the directional control laws. The HH loop will be re-engaged automatically during flight in the AHH region whenever the directional controller is in detent.

The directional control input loop 707 shown in FIG. 7 is employed to convert the pilot input from the directional controller to the associated command formats depending on which loop is in use. The associated command inputs from the pilot are converted in Tables 5 and 6.

The innovation of the directional control input design provides the following advanced benefits: the ability of the pilot to precisely control yaw rate and heading; easy adjustment of control sensitivity to match design guidelines or make adjustments during flight test; the ability of the pilot to use the beep command switch to fine tune heading; the ability of the pilot to seamlessly transition from one mode to another during each maneuver; and the ability of the pilot to fly the aircraft in the directional axis with increased agility.

Simplified Vertical Control Laws Loops

Figure 8:
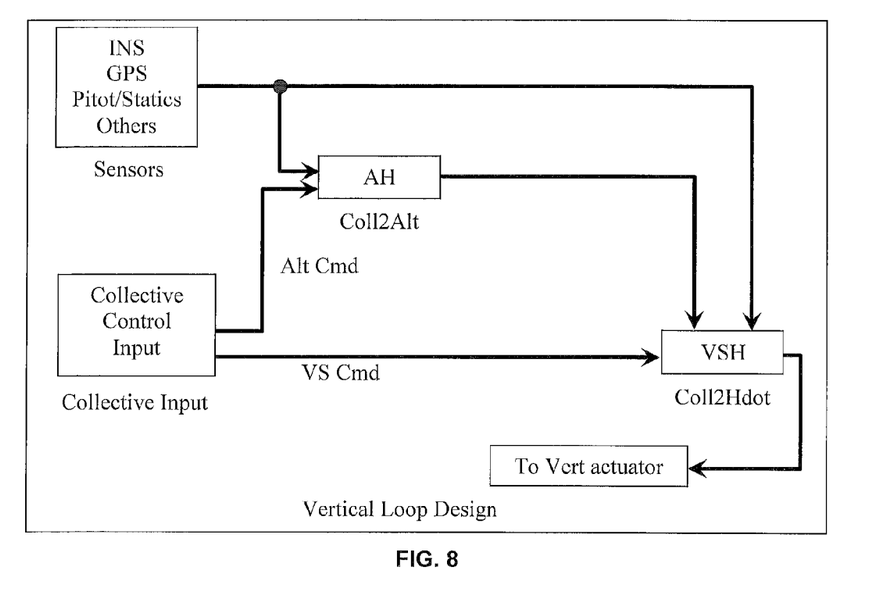
FIG. 8 shows vertical loop design.

The vertical loop design 801 is shown in FIG. 8. The mode switching logic of the vertical control law design is defined as Mode Logic 211 shown in FIG. 2. In the preferred embodiment, the first vertical loop is VSH 803, which is defined as Coll2Hdot. The second loop is AH 805, defined as Coll2Alt. During low speed and hover flight conditions, the vertical control laws will hold altitude AGL when the vertical controller is in detent. When the controller is out of detent or if the vertical beep is commanded, the control laws will hold a vertical speed.

The collective control input loop 807 is shown in FIG. 8 and is utilized to convert the pilot input from the vertical controller to the associated command formats depending on which loop is in use. Tables 7 and 8 show the associated vertical command inputs from the pilot.

Figure 9:
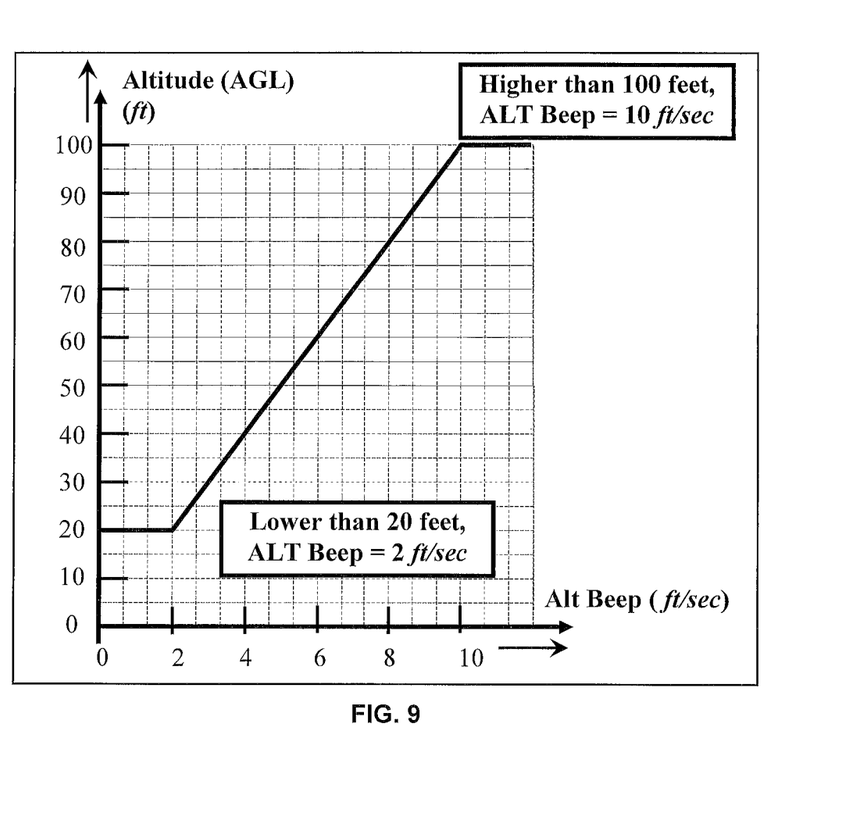
FIG. 9 shows the vertical beep scheduling with altitude.

Vertical beep during flight in the AHH/TRC region is shown in FIG. 9. The vertical beep function is gain scheduled with respect to the altitude AGL. When AGL altitude is lower than 20 feet, the beep rate is 2 feet per second. The vertical beep increases proportionally from 2 feet per second to 10 feet per second as altitude AGL increases from 20 to 100 feet. The maximum vertical beep of 10 feet per second occurs when altitude AGL is at or above 100 feet. The vertical beep rate also ramps up over time. For example, if the pilot holds the altitude beep switch for one second when higher than 100 feet AGL, the vertical beep will reach 2 feet per second. If the pilot holds the switch for 5 seconds or longer, the vertical beep will reach a steady state rate of 10 feet per second.

Logic Design

One of the main objectives for the AHH function is to capture the hover state following an aircraft deceleration. This function will greatly reduce the pilot's workload especially in a degraded visual environment.

The second objective is to effectively hold the aircraft position following the hover capture. The current invention will accurately hold hover position even while turning in strong, gusty winds with the pilot's hands off of the controls.

The third objective is to enable the pilot to have carefree controlled flight in any condition. When all controls are in detent positions, the aircraft will automatically stabilize and fly in its associated modes.

The fourth objective is to smoothly transition through the different modes. For example, the advanced CLAWS allow for a smooth transition from TRC mode to attitude command mode, and then finally to speed hold mode. The difference between the two commands can cause a jump in the control input. However, initialization logic is used to ensure transient-free switching from one mode to another.

The fifth objective is to provide HSTH, where the pilot can trim the aircraft to automatically capture hover from a high speed by using the longitudinal beep to set a pitch attitude for steady deceleration.

The sixth objective is to transition the aircraft into EHH mode during an emergency situation. Usually, the EHH mode will not trigger when the pilot is in control.

Automatic Hover Hold (AHH) Mode

Figure 10:
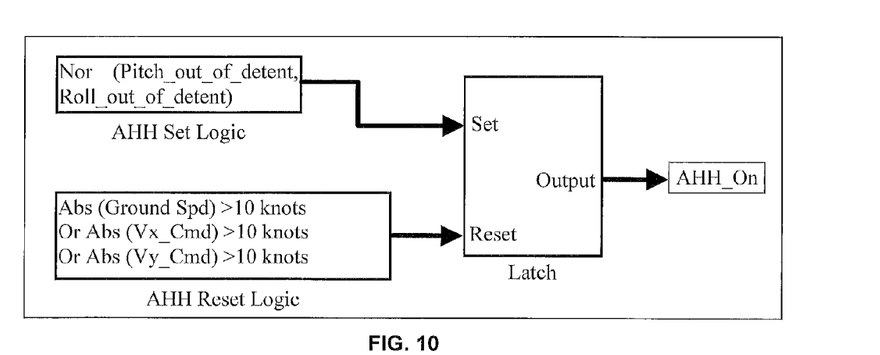
FIG. 10 shows the logic of AHH.

The logic 1001 of achieving the AHH function 1003 is shown in FIG. 10. The factors which determine if the AHH function is active (AHH_On) include total ground speed, commanded groundspeed (Vx_Cmd or Vy_Cmd), and controller detent status. The AHH logic will set the latch 1005 when both the longitudinal and lateral controllers are returned to the detent position, as long as the total groundspeed is below the AHH threshold. This value can be set according to mission requirements. In the preferred embodiment, the AHH threshold was set to 10 knots. Once in the AHH mode, the aircraft will automatically enter a stable hover with the controller in detent. With the controller out of detent, the aircraft will move at a translational rate in the direction of and in proportion to the displacement of the longitudinal and lateral controllers. The AHH logic latch will reset, thus deactivating AHH, when either the total actual groundspeed or commanded groundspeed exceeds the AHH threshold.

Longitudinal and lateral beeps in AHH mode are also reserved for the present application. When the aircraft is in AHH mode, the TRC from longitudinal and lateral beep is scheduled with altitude AGL as shown is FIG. 4. This new innovation enables the pilot to fine tune the aircraft's hover position. In the preferred embodiment, the TRC beep is increased proportionally by 1 knot for each 10 feet increase in altitude from 10 to 50 feet. This TRC beep schedule can be adjusted based on mission requirements.

When in the AHH mode, the longitudinal and lateral TRC response is first-order and symmetrical. This makes translational movement from a stable hover very easy and intuitive, since the pilot just has to displace the controller in the desired direction of movement. In the preferred embodiment, the first 0.1-0.2 inch of aircraft stick movement is used to determine whether the stick is in the detent position. Furthermore, each 0.1 inch of stick displacement above the detent position will result in an additional 1 knot of commanded translational rate. With the AHH threshold set to 10 knots in the preferred embodiment, the total range for TRC is 1.0 inch above the detent position. Based on mission requirements, the TRC proportion of controller displacement to translational rate can be adjusted. For example, if each 0.1 inch is driving 1.5 knots, the AHH region can be increased to 15 knots, instead of 10 knots as shown in FIG. 1. Similarly, the total controller displacement for the AHH threshold can be adjusted. For example, if the total desired TRC speed is 6 knots, then TRC will be engaged for up to 0.6 inch instead of 1.0 inch. The design of TRC mode is object-oriented (flexible flight characteristics) based on implementation and application.

Position Hold (PH) Mode

Figure 11:
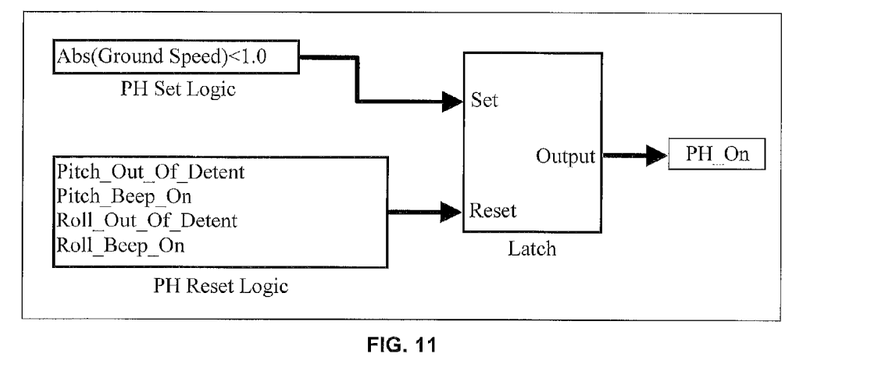
FIG. 11 shows the logic of the PH.

The PH logic 1101 is shown in FIG. 11. The latch logic 1103 will be set and PH 1105 engaged when groundspeed drops below the PH threshold, as long as the longitudinal and lateral controllers are in detent and the longitudinal and lateral beep switches are not actuated. In the preferred embodiment, the PH threshold is set to 1 knot of groundspeed. This threshold can be adjusted based on mission requirements. If the vertical and directional controllers are also released, then the advanced CLAWS will also automatically hold altitude AGL and heading steady. In the PH mode, the control laws will automatically hold the position over the ground, altitude AGL, and heading by engaging the following control loops:
Longitudinal: Long2X, see box 309 of FIG. 3,
Lateral: Lat2Y, see box 511 of FIG. 5 and box 609 of FIG. 6,
Directional: Ped2Psi, see box 703 of FIG. 7, and
Vertical: Coll2Alt, see box 805 of FIG. 8.

The GPS position over the ground is captured by initializing the Long2X and Lat2Y loops when latch conditions shown in FIG. 11 are met. With PH engaged, the captured position will be tightly held even in the presence of disturbances due to gusty winds or control inputs in the directional or vertical axes. If the aircraft drifts off from the captured position, the PH mode will make corrections to bring it back.

The latch logic shown in FIG. 11 will be reset when the longitudinal or lateral controllers are moved out of detent or if either the longitudinal or lateral beeps are activated.

High Speed Transition to Hover (HSTH)

When the aircraft is flying at a higher airspeed, the pilot can accomplish the following steps to trim the aircraft to automatically decelerate to a hover while in the ACAH mode:
1) Use the longitudinal controller to command a nose up pitch attitude and deceleration rate.
2) Activate the longitudinal aft beep while continuing to hold pitch attitude with the longitudinal controller. As the pitch reference is adjusted with the beep, the pilot will need to release aft longitudinal controller to hold pitch attitude. When the pitch reference matches the held pitch attitude, the longitudinal controller will be back in detent and the longitudinal CLAWS will be in attitude hold.
3) The aircraft will decelerate at a constant rate until ground speed is less than the AHH threshold, at which point the AHH mode will automatically engage and pull the aircraft into a hover.
4) The pilot can adjust the deceleration rate by changing pitch with the longitudinal beep. Furthermore, the HSTH can be stopped by moving the longitudinal controller out of detent.

If the pilot moves the longitudinal controller aft out of detent while in speed hold at higher speeds and then releases it back to the detent position, then HSTH will not take place since speed hold will be re-engaged. If the pilot moves the longitudinal controller aft and holds it out of detent, the aircraft will fly in attitude command mode and will not enter AHH when passing the AHH threshold.

In order to hold a steady deceleration during HSTH, the steady state trim method is applied. Once the pitch attitude is set with the longitudinal controller in detent, the control laws will enter the attitude hold mode. Initially, when the longitudinal controller is returned to detent, the control laws will capture the difference between the reference pitch attitude and the steady state trim pitch attitude for the current airspeed. This attitude difference is then added to the steady state trim attitude so that as the aircraft decelerates, the reference pitch attitude will be continually adjusted to hold a constant deceleration. The attitude hold mode will also work in this same manner to hold a constant acceleration if pitch is trimmed below the steady state trim attitude with the longitudinal controller in detent.

Emergency Hover Hold (EHH)

The EHH mode can be included as an optional kit based on mission requirements. This mode will be engaged in the following scenarios:
1) If the pilot loses consciousness, possibly due to a heart attack or battle injuries. This could be detected by biometric feedback (i.e. pulse or eye contact detection) or by monitoring the pilot's control inputs.
2) If the pilot needs to release aircraft control to the flight control computer due to inadvertently encountering DVE, such as brownout. In this case, the pilot could activate a cockpit switch to manually enter the EHH mode.
3) If equipment, device, and/or sensor failures are detected which make it impossible for the pilot to control the aircraft.

Figure 12:
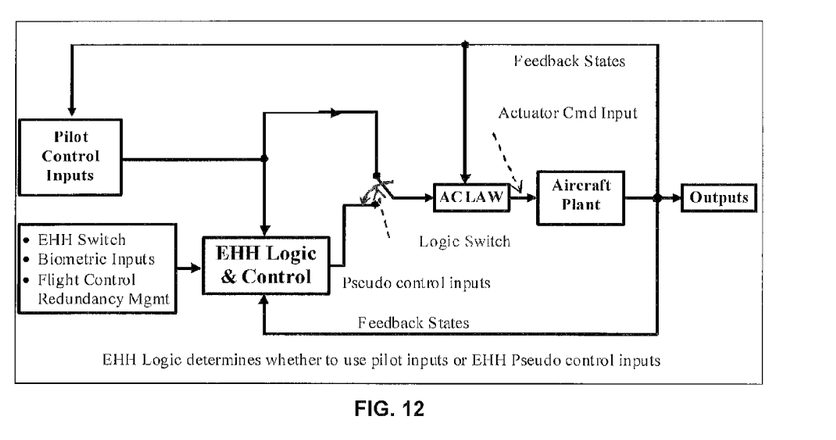
FIG. 12 shows the architecture for the emergency hover hold mode.

FIG. 12 shows how the EHH Logic 1201 will determine whether to use the pilot's control inputs or the EHH pseudo control inputs to control the aircraft. Inputs into the EHH logic block include the pilot's control inputs, the feedback of the aircraft state, biometric measures of the pilot's consciousness, the cockpit EHH switch, and an input from the flight control redundancy management system which signals that control system failures are preventing the pilot from controlling the aircraft.

The EHH logic will monitor the pilot's control inputs and aircraft state to detect if the pilot has lost consciousness. Switching the CLAW input from man to unmanned flight could be commanded under the following scenarios:
1) When the pilot is unconscious, the controls may be inadvertently moved beyond reasonable limits based on flight conditions. In this case, if the pilot does not make a correction within a certain period, the control laws will enter EHH.
2) If the pilot moves the control stick and subsequently becomes unconscious or experiences spatial disorientation, the aircraft may enter an unusual attitude from which recovery before ground impact is not possible. If the pilot does not make a correction before exceeding reasonable aircraft limits based on flight conditions, the control laws will enter EHH.
3) If the biometric feedback (pulse and/or eye detection) senses a possible loss of consciousness, the EHH logic will monitor the pilot's control inputs to determine if the pilot has actually lost consciousness. If reasonable control inputs are not sensed within a certain time period, the control laws will enter EHH.

As an additional safety feature, the aircraft's crew alerting system will notify the aircrew if the EHH mode has been activated. If the pilot is conscious and does not want the EHH mode to be active, he or she will be able to cancel the EHH mode by cycling the EHH cockpit switch back to off. The pilot will also be able to cancel the EHH mode by moving any control out of the detent position in a controlled fashion.

If the EHH mode is engaged during cruise flight conditions, the pseudo control inputs will fly the aircraft to the closest programmed emergency landing site. If the programmed landing site is the home base, then the EHH mode essentially becomes a "Go Home" mode. In the terminal phase, the EHH mode will fly a pre-programmed approach profile to automatically enter a hover over the landing site.

If the EHH mode is engaged during low speed or hovering flight conditions, the aircraft will automatically decelerate at a nominal rate of around 5 knots per second until it enters a hover at its current location. In either the cruise or low speed/hover EHH scenario, the aircraft will automatically land itself once the fuel state decreases below a preset value.

The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A method to control hovering flight of a rotary aircraft, the rotary aircraft having a longitudinal controller and a lateral controller, the method comprising:
defining a first flight envelope having a first groundspeed threshold;
defining a second flight envelope having a second groundspeed threshold, the second flight envelope being defined within the first envelope;
engaging an automatic hover hold with a control law hover hold architecture as the aircraft enters the first flight envelope;
engaging an automatic position hold with a control law position hold architecture as the aircraft enters the second flight envelope; and
interchanging the automatic hover hold and the automatic position hold as the rotary aircraft moves between the first flight envelope and the second flight envelope;
wherein at least one of the engaging the automatic hover hold and the engaging an automatic position hold is performed in response to at least one of the longitudinal controller and the lateral controller being in a detent position.

2. The method of claim 1, further comprising:
maneuvering the rotary aircraft within the first envelope with a translational rate command, the translational rate command being adapted to control longitudinal flight of the rotary aircraft with movement of the longitudinal controller and lateral flight of the rotary aircraft with movement of the lateral controller.

3. The method of claim 1, further comprising:
disengaging the translational rate command as the aircraft groundspeed exceeds the first groundspeed threshold.

4. The method of claim 1, wherein the first groundspeed threshold is 10 knots.

5. The method of claim 1, wherein the second groundspeed threshold is 1 knot.

6. The method of claim 1, wherein engaging automatic hover flight within the first envelope is achieved when both the longitudinal controller and the lateral controller are released.

7. The method of claim 1, wherein engaging a position hold flight is achieved when both the longitudinal controller and the lateral controller are released.

8. The method of claim 1, further comprising:
transitioning between a high speed envelope to the first envelope by decreasing acceleration of the rotary aircraft by moving the longitudinal controller in the aft position and then using an aft beep to trim the aircraft at a higher pitch angle;
wherein the aircraft will decelerate at a constant rate and then automatically hover upon entry in the first flight envelope.

9. The method of claim 8, further comprising:
fine tuning the deceleration of the aircraft with a aft beep switch operably associated with the longitudinal controller and adapted to trim the rotary aircraft at a higher pitch angle.

10. The method of claim 1, wherein the translational rate command mode engages if the movement of the lateral controller is less than a predetermined displacement value; and wherein the an attitude command mode engages if the movement of the lateral controller is greater than a predetermined displacement value.

11. The method of claim 10, wherein the predetermined displacement value is 0.4 inches.

12. The method of claim 1, further comprising:
engaging the automatic hover hold in response to at least one of a detected pilot medical condition, a visual brownout indicated by a pilot, and a detected equipment failure.

13. A flight control system for a rotary aircraft, the rotary aircraft having a longitudinal controller, a lateral controller, a directional controller, and a vertical controller, the control system comprising:
a longitudinal loop design having:
a forward speed hold loop;
a pitch attitude loop; and
a pitch rate loop;
wherein the forward speed hold loop automatically engages when the longitudinal controller is returned to a detent position and the aircraft groundspeed is outside a first groundspeed threshold; and
wherein longitudinal maneuverability of the rotary aircraft is controlled by either the pitch attitude loop or the pitch rate loop when the longitudinal controller is out of the detent position;
a lateral loop design having:
a lateral speed hold loop; and
a roll rate loop;
wherein the lateral speed hold loop automatically engages when the lateral controller is returned to a detent position and the aircraft groundspeed is outside the first groundspeed threshold; and
wherein lateral maneuverability of the rotary aircraft is controlled by either the lateral speed hold loop or the roll rate loop when the lateral controller is out of the detent position;
a directional loop design having:
a yaw rate command loop; and
a heading hold loop;
wherein the heading hold loop will be re-engaged automatically during flight in the first groundspeed threshold when the directional controller is in detent; and
a vertical control loop design having:
a vertical speed hold loop; and
an altitude hold loop;
wherein the altitude hold loop automatically engages when the vertical controller is returned to a detent position and the aircraft groundspeed is inside the first groundspeed threshold; and wherein vertical maneuverability of the rotary aircraft is controlled by the vertical speed hold loop if the vertical controller is out of the detent position.

14. The control system of claim 13, further comprising:
a steady state attitude search method associated with the forward speed hold loop, the steady state attitude search method being adapted to increase a stabilization of the forward speed hold loop and a stabilization speed of the lateral speed hold loop.

15. The control system of claim 13, further comprising:
a longitudinal speed beep operably associated with the longitudinal loop design.

16. The control system of claim 13, further comprising:
a bank attitude loop operably associated with the roll rate loop.

17. The control system of claim 13, further comprising:
a fader switch operably associated with the lateral speed hold loop and the roll rate loop, the fader switch being adapted to smooth the transition between the lateral speed hold loop and the roll rate loop.

18. The control system of claim 11, further comprising:
a lateral beep switch adapted to fine-tune the rotary aircraft hover position with improved precision.

19. A method for high speed transition to hover for an aircraft, comprising:
commanding a nose pitch attitude and a deceleration rate with a longitudinal controller;
activating a longitudinal aft beep while continuing to hold pitch attitude with the longitudinal controller;
releasing an aft longitudinal controller to hold pitch attitude;
automatically decelerating the aircraft at a constant rate;
defining a first flight envelope having a first groundspeed threshold; and
engaging a hover hold with a control law hover hold architecture as the aircraft enters the first flight envelope;
wherein the engaging the hover hold is initiated in response to the longitudinal controller being in a detent position.

20. The method of claim 19, further comprising:
adjusting a deceleration rate of the aircraft by changing the pitch attitude with a longitudinal beep switch.

* * * * *